(12) United States Patent
Oh et al.

(10) Patent No.: US 10,533,904 B2
(45) Date of Patent: Jan. 14, 2020

(54) ELASTICALLY ACTUATING DEVICE

(71) Applicant: DAEGU GYEONGBUK INSTITUTE OF SCIENCE AND TECHNOLOGY, Dalseong-gun Daegu (KR)

(72) Inventors: Sehoon Oh, Gyeonggi-do (KR); Chan Lee, Dalseo-gu Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 15/564,091

(22) PCT Filed: Apr. 20, 2017

(86) PCT No.: PCT/KR2017/004229
§ 371 (c)(1),
(2) Date: Oct. 3, 2017

(87) PCT Pub. No.: WO2017/183919
PCT Pub. Date: Oct. 26, 2017

(65) Prior Publication Data
US 2019/0041276 A1    Feb. 7, 2019

(30) Foreign Application Priority Data

Apr. 20, 2017  (KR) .................. 10-2016-0048189

(51) Int. Cl.
*G01L 1/04*      (2006.01)
*H02K 11/21*     (2016.01)
(Continued)

(52) U.S. Cl.
CPC ............... *G01L 1/048* (2013.01); *F16H 1/28* (2013.01); *F16H 19/04* (2013.01); *F16H 57/08* (2013.01);
(Continued)

(58) Field of Classification Search
CPC ........ G01L 1/048; H02K 11/21; H02K 11/24; F16H 19/04; F16H 57/08; F16H 1/2863; F16H 55/18
See application file for complete search history.

(56) References Cited

U.S. PATENT DOCUMENTS 8,708,852 B2 *  4/2014  Park .................. F16K 31/56
                                                    475/4
8,821,338 B2 *  9/2014  Thorson .................. F16D 3/50
                                                    475/331
(Continued)

FOREIGN PATENT DOCUMENTS

DE    102005001740 B3 *  7/2006  .......... B60G 15/065
DE    102014105321 A1    10/2015
(Continued)

OTHER PUBLICATIONS

International Search Report received for International Patent Application No. PCT/KR2017/004229, dated Jul. 25, 3 pages
(Continued)

*Primary Examiner* — Vicky A Johnson

(57) ABSTRACT

Provided is an elastically actuating device including an actuator configured to generate a rotary force, a gear part connected to the actuator and configured to transfer the rotary force from the actuator to an outside, and an elastic member including one end fastened to a ground and the other end connected to the gear part, and an elastic member including one end fastened to a ground and another end connected to the gear part, disposed outside the actuator to cover the actuator from the one end to the other end, and deformed in response to the gear part rotating relative to the actuator.

14 Claims, 4 Drawing Sheets

(51) Int. Cl.
  *H02K 7/116* (2006.01)
  *F16H 1/28* (2006.01)
  *H02K 11/24* (2016.01)
  *F16H 57/08* (2006.01)
  *F16H 19/04* (2006.01)
  *H02K 7/06* (2006.01)
  *F16H 55/18* (2006.01)
(52) U.S. Cl.
  CPC ............... *H02K 7/06* (2013.01); *H02K 7/116* (2013.01); *H02K 11/21* (2016.01); *H02K 11/24* (2016.01); *F16H 1/2863* (2013.01); *F16H 55/18* (2013.01)

(56) References Cited

U.S. PATENT DOCUMENTS

| | | |
|---|---|---|
| 2008/0011113 A1 | 1/2008 | Safran et al. |
| 2010/0005907 A1 | 1/2010 | Kato et al. |
| 2012/0153875 A1 | 6/2012 | Glaister |
| 2012/0234117 A1 | 9/2012 | Oswald |
| 2013/0074635 A1 | 3/2013 | Thorson |
| 2016/0101322 A1 | 4/2016 | Potter et al. |
| 2019/0041276 A1* | 2/2019 | Oh .......................... F16H 1/28 |

FOREIGN PATENT DOCUMENTS

| | | | | |
|---|---|---|---|---|
| GB | 1428021 A | * | 3/1976 | ............ F16H 55/18 |
| JP | 2010-532718 A | | 10/2010 | |
| JP | 2014-512977 A | | 5/2014 | |
| KR | 10-1992-0018380 A | | 10/1999 | |
| KR | 10-2000-0057974 A | | 10/2000 | |
| KR | 10-2004-0096814 A | | 11/2004 | |
| KR | 10-2010-0049916 A | | 5/2010 | |
| KR | 10-2012-0118814 A | | 10/2012 | |
| WO | WO-9714208 A1 | * | 4/1997 | ............ H02K 7/108 |

OTHER PUBLICATIONS

Paine, N., et al., "Design and Control Considerations for High-Performance Series Elastic Actuators", IEEE/ASME Transactions on Mechatronics, vol. 19, No. 3, Jun. 2014, pp. 1080-1091.

* cited by examiner

ELASTICALLY ACTUATING DEVICE

CROSS-REFERENCE TO RELATED APPLICATIONS

This application is a national phase claiming the benefit of and priority to International Patent Application No. PCT/KR2017/004229, entitled ELASTICALLY ACTUATING DEVICE, filed Apr. 20, 2017, which claims priority to Japanese Patent Application No. 10-2016-0048189, filed Apr. 20, 2016, which are hereby incorporated by reference in their entireties.

TECHNICAL FIELD

One or more exemplary embodiments relate to an elastically actuating device.

BACKGROUND ART

As equipments that require accurate operations are gradually miniaturized, technologies for miniaturizing an actuating device for actuating the equipments have been continuously developed. Technologies for changing a structure of a gear assembly that is connected to the actuating device in series and rotates in the actuating device have been continuously developed. For example, Korean Patent Application No. 10-1992-0018380 discloses a wave gear actuating device.

DISCLOSURE OF INVENTION

Technical Goals

An aspect provides an elastically actuating device having a relatively great reduction ratio and a relatively small backlash.

Another aspect provides an elastically actuating device for accurately sensing a rotary force transferred from an actuator to an outside and accurately controlling the rotary force occurring from the actuator.

Still another aspect provides an elastically actuating device to be applicable to various devices by miniaturizing a device to be a modular-type device.

Technical Solutions

According to an aspect, there is provided an elastically actuating device including an actuator configured to generate a rotary force, a gear part connected to the actuator and configured to transfer the rotary force from the actuator to an outside, and an elastic member including one end fastened to a ground and the other end connected to the gear part, disposed outside the actuator to cover the actuator from the one end to the other end, and deformed in response to the gear part rotating relative to the actuator.

The gear part may include a first actuating member connected to the actuator to be rotatable relative to the actuator, a second actuating member configured to transfer the rotary force from the first actuating member to the outside, and a third actuating member engaged with the first actuating member or the second actuating member and connected to the other end of the elastic member.

The second actuating member may be engaged with the first actuating member, and the third actuating member is engaged with the second actuating member.

The first actuating member may be a sun gear, the second actuating member may be a planetary gear, and the third actuating member may be a ring gear.

The first actuating member may be a waveform generator, the second actuating member may be a flexspline, and the third actuating member may be a circular spline.

The elastically actuating device may further include a sensing portion disposed on one end or the other end of the elastic member and configured to sense a deformation value of the elastic member measured from the one end of the elastic member to the other end of the elastic member.

The elastically actuating device may further include a controller configured to control a rotary force or a rotary speed of the actuator based on the deformation value of the elastic member.

The elastically actuating device may further include a connection bracket connected to the other end of the elastic member and the gear part, the connection bracket being extended from the other end of the elastic member to the gear part by covering the actuator.

The elastically actuating device may further include a fastened bracket disposed on an outer side of the actuator and configured to allow the actuator to be fastened to an external system, and a bearing member disposed between the connection bracket and the fastened bracket.

The ground may be the actuator, an external system, or a flange provided on an outer side of the actuator.

The elastically actuating device may further include an auxiliary gear part configured to connect the actuator and the gear part and decrease a rotary speed of the actuator.

According to another aspect, there is provided an elastically actuating device including an actuator configured to generate a rotary force, a gear part including a first actuating member connected to the actuator to be rotatable relative to the actuator, a second actuating member engaged with the first actuating member, and a third actuating member engaged with the second actuating member, and an elastic member including one end fastened to a ground and the other end connected to the third actuating member, and configured to elastically support the gear part.

The first actuating member may be a sun gear, the second actuating member may be a planetary gear, and the third actuating member may be a ring gear.

The first actuating member may be a waveform generator, the second actuating member may be a flexspline, and the third actuating member may be a circular spline.

The elastically actuating device may further include a first sensor configured to measure a displacement of the first actuating member, and a second sensor configured to measure a displacement of the third actuating member.

The elastically actuating device may further include a controller configured to calculate a displacement of the second actuating member based on the measured displacement of the first actuating member and the measured displacement of the third actuating member, and control the rotary force and a rotary speed of the actuator based on the displacement of the first actuating member, the displacement of the second actuating member, or the displacement of the third actuating member.

Effects

According to an embodiment, an elastically actuating device having a relatively great reduction ratio and a relatively small backlash may stably transfer a rotary force to an outside, and achieve positioning of a device to which the elastically actuating device is to be applied.

According to an embodiment, an elastically actuating device may accurately sense a rotary force transferred from an actuator to an outside and accurately control the rotary force occurring from the actuator.

According to an embodiment, an elastically actuating device may be applicable to various devices by miniaturizing a device to be a modular-type device.

An effect of an elastically actuating device is not limited to the foregoing, and other effects that are not mentioned are clearly understood by those skilled in the art from the following descriptions.

BEST MODE FOR CARRYING OUT THE INVENTION

Figure 1:
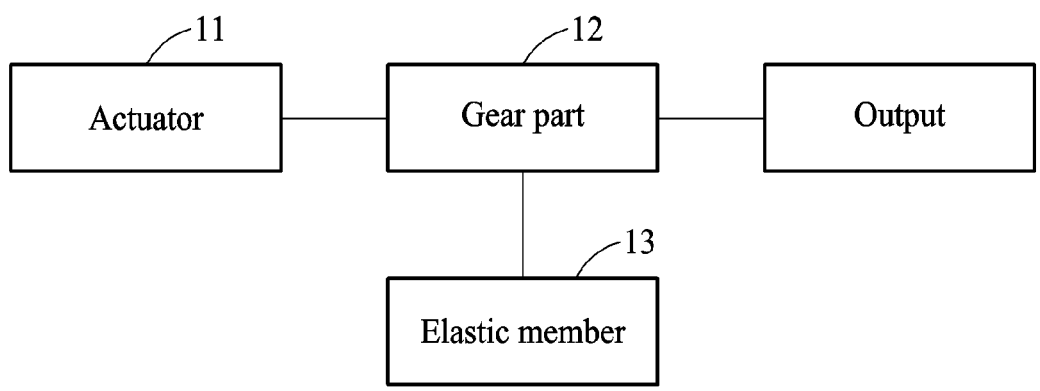
FIG. 1 is a block diagram illustrating a configuration of an elastically actuating device according to an embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 is a block diagram illustrating a configuration of an elastically actuating device according to an embodiment.

Referring to FIG. 1, an elastically actuating device 1 is elastically actuated and stably transfers a rotary force to an outside. The elastically actuating device 1 includes an actuator 11, a gear part 12, and an elastic member 13.

The actuator 11 may generate the rotary force. For example, the actuator 11 may a rotary motor including a rotation shaft, a hydraulic motor including a rotating shaft, and/or a combination thereof. A portion of the actuator 11 may be fastened to a ground. For example, the actuator 11 may be fastened to a portion of component of a device to which the elastically actuating device 1 is to be applied.

The gear part 12 is connected to the actuator 11 and transfers the rotary force from the actuator 11 to the outside. In this case, the gear part 12 may be a reduction gear. For example, the reduction gear includes a differential gear, and the differential gear includes a planetary gear, a harmonic gear, and a cycloid gear. The gear part 12 may be connected to the actuator 11 in series.

The elastic member 13 may elastically support the actuator 11 and/or the gear part 12. One end of the elastic member 13 may be fastened to the actuator 11 or the ground, and the other end of the elastic member 13 may be connected to the gear part 12.

Figure 2:
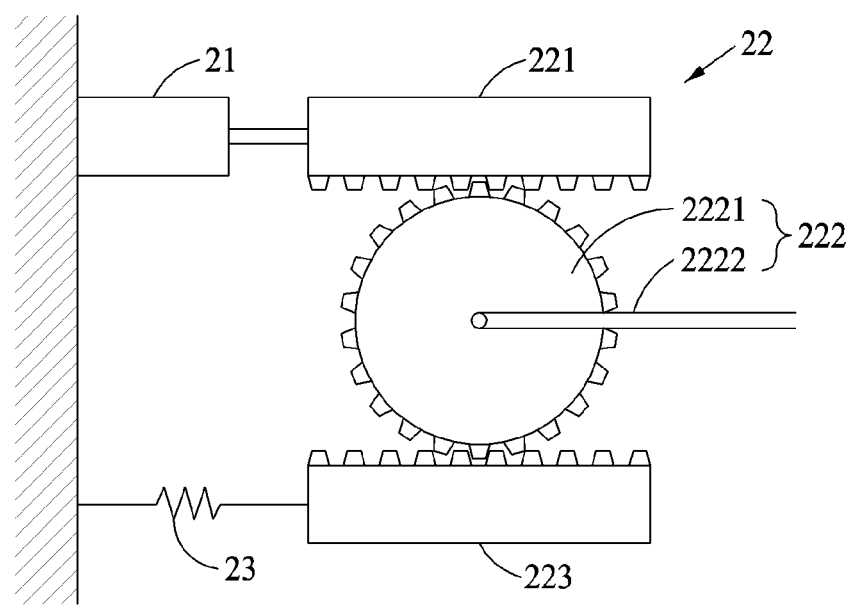
FIG. 2 is a diagram illustrating an elastically actuating device according to an embodiment.

FIG. 2 is a diagram illustrating an elastically actuating device according to an embodiment.

Referring to FIG. 2, an elastically actuating device 2 includes an actuator 21, a gear part 22, and an elastic member 23.

The actuator 21 includes one end fastened to a ground and the other end connected to the gear part 22.

The gear part 22 may transfer a rotary force generated from the actuator 21 to an outside. The gear part 22 includes a first actuating member 221, a second actuating member 222, and a third actuating member 223.

The first actuating member 221 may be connected to the actuator 21 to be rotatable relative to the actuator 21. Thus, the first actuating member 221 may receive the rotary force from the actuator 21.

The second actuating member 222 may transfer the rotary force from the first actuating member 221 to the outside. The second actuating member 222 includes a first actuating element 2221 and a second actuating element 2222. The first actuating element 2221 may be engaged with the first actuating member 221 and thereby receive the rotary force from the first actuating member 221. The second actuating element 2222 is provided in the first actuating element 2221 and transfers the rotary force transferred to the first actuating element 2221 to the outside.

The third actuating member 223 may be engaged with the second actuating member 222. The third actuating member 223 may be connected to one end or the other end of the elastic member 23 and elastically supported by the elastic member 23.

One end of the elastic member 23 may be fastened to the ground and the other end may be connected to the third actuating member 223.

Based on such structure, the gear part 22 may perform an elastic behavior in response to the elastic member 23 elastically supporting the gear part 22 when the gear part 22 transfers the rotary force from the actuator 21 to the outside. When the gear part 22 performs the elastic behavior, a device to be connected to the gear part 22 may also perform an elastic behavior, and an accurate impedance-based control may be performed with respect to a behavior of the device to be connected to the gear part 22.

Figure 3:
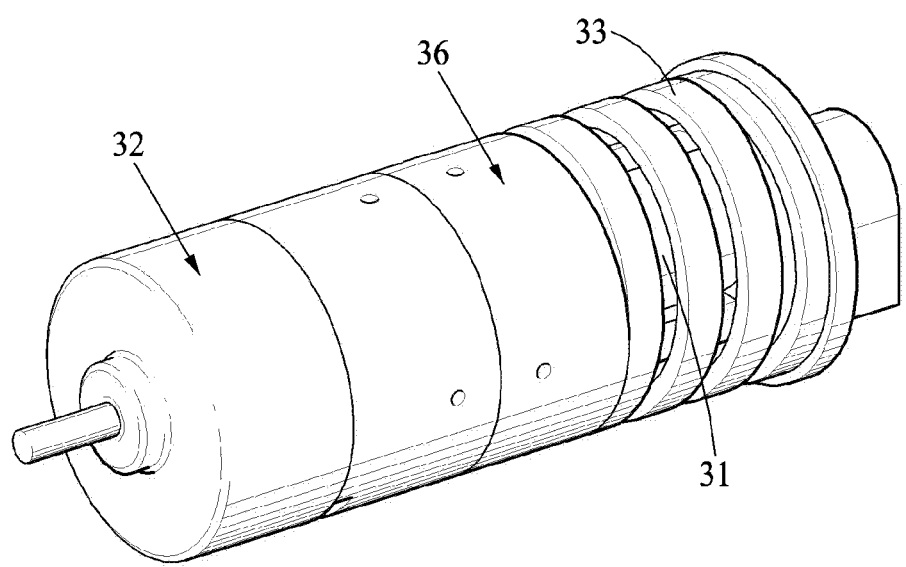
FIG. 3 is a perspective view illustrating an elastically actuating device according to an embodiment.
Figure 4:
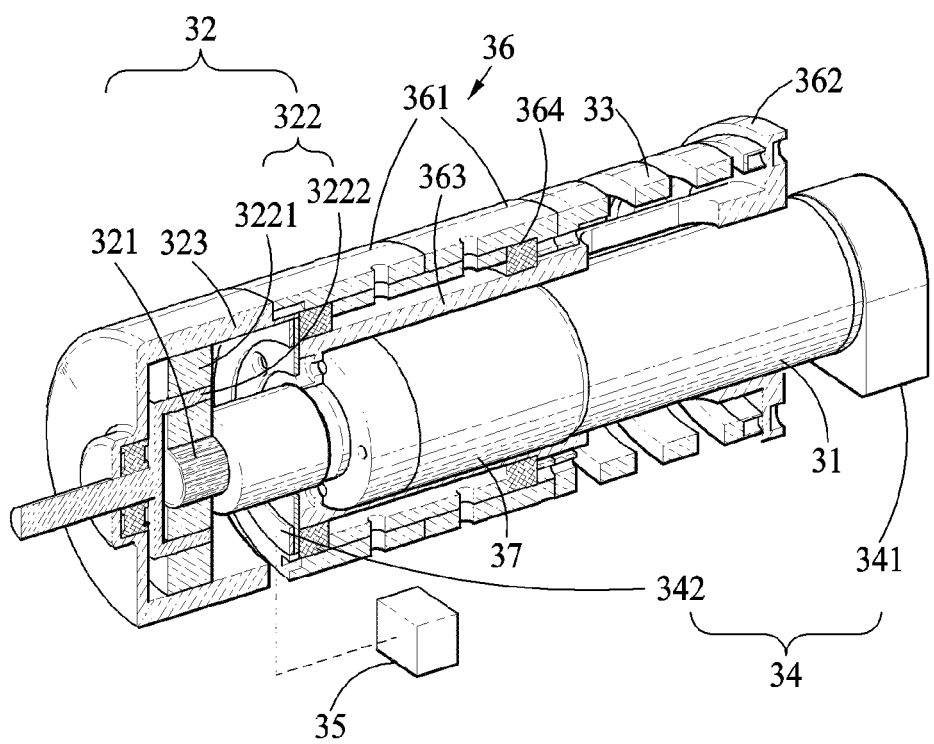
FIG. 4 is a cross-sectional view illustrating an elastically actuating device according to an embodiment.
Figure 5:
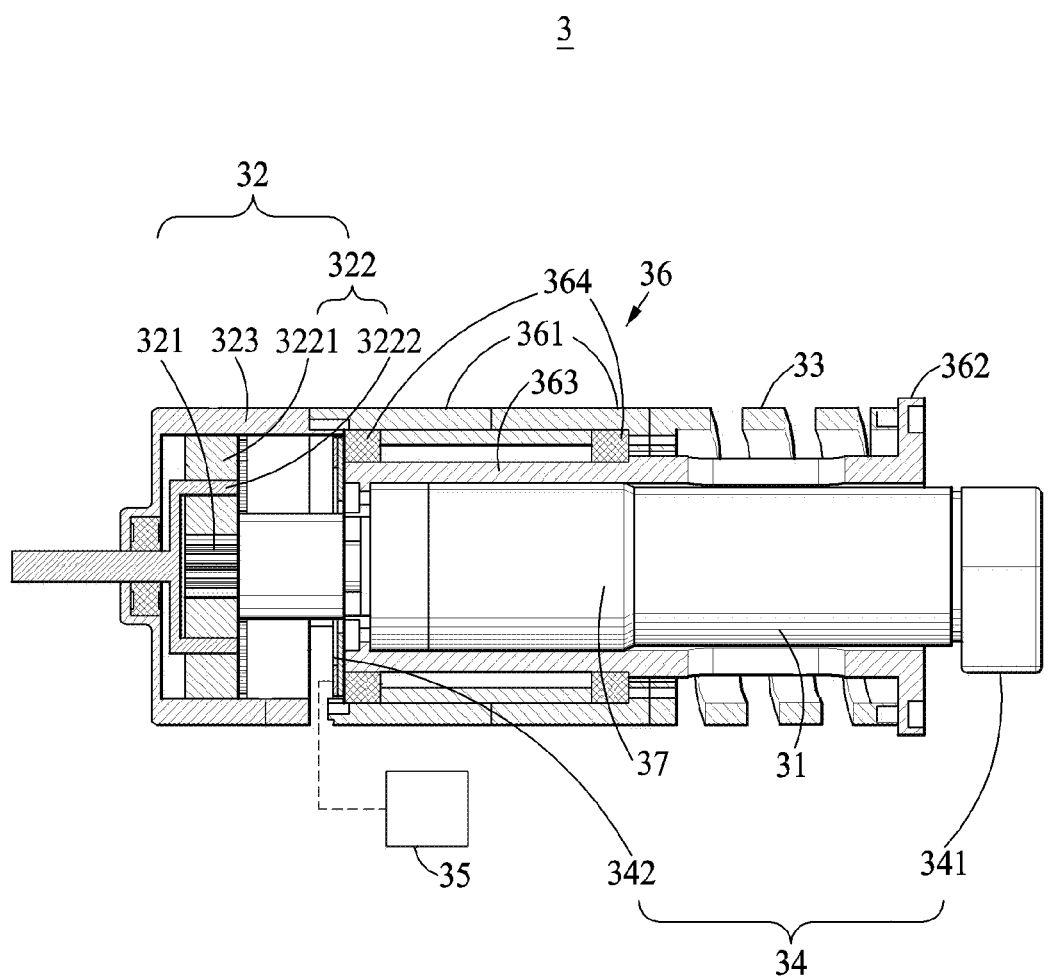
FIG. 5 is a side cross-sectional view illustrating an elastically actuating device according to an embodiment.

FIG. 3 is a perspective view illustrating an elastically actuating device according to an embodiment, FIG. 4 is a cross-sectional view illustrating an elastically actuating device according to an embodiment, and FIG. 5 is a side cross-sectional view illustrating an elastically actuating device according to an embodiment.

Referring to FIGS. 3 through 5, an elastically actuating device 3 is a device in a modular type of which a size is miniaturized and is applicable to various devices. The elastically actuating device 3 includes an actuator 31, a gear part 32, an elastic member 33, a sensing portion 34, a controller 35, and a supporter 36.

The actuator 31 may generate a rotary force. For example, the actuator 31 may be a driving motor. In this example, the actuator 31 may include a rotating shaft for transferring the generated rotary force to the outside and a main body in a form of a cylinder. At least a portion of the actuator 31 may be provided in a device to which the elastically actuating device 3 is to be applied.

The gear part 32 may transfer the rotary force from the actuator 31 to the outside. Although the gear part 32 is not directly connected to the actuator 31 in FIGS. 3 through 5, this is not limited thereto. The gear part 32 may be directly connected to the actuator 31. The gear part 32 includes a first actuating member 321, a second actuating member 322, and a third actuating member 323.

The first actuating member 321 may be connected to the actuator 31 to be rotatable relative to the actuator 31. When the actuator 31 includes a rotating shaft, the first actuating member 321 may be connected to the rotating shaft of the actuator 31. Thus, the rotary force generated from the actuator 31 may be transferred to the first actuating member 321.

The second actuating member 322 may transfer the rotary force from the first actuating member 321 to the outside. The second actuating member 322 includes a first actuating element 3221 and a second actuating element 3222.

The first actuating element 3221 is engaged with the first actuating member 321 and thereby receives the rotary force from the first actuating member 321. The second actuating element 3222 may be provided in the first actuating element 3221 and transfer the rotary force transferred to the first actuating element 3221 to the outside. For example, when the first actuating element 3221 is a planetary gear, the second actuating element 3222 may be a planetary carrier.

A plurality of first actuating elements, for example, the first actuating element 3221, may be disposed on an outer side of the first actuating member 321 based on the first actuating member 321 such that the first actuating elements are engaged with the first actuating member 321. In this case, the second actuating element 3222 may include a plurality of input shafts connected to each of the first actuating elements, for example, the first actuating element 3221, and one output shaft connected from the input shafts to the outside. Thus, the rotary force uniformly transferred to the first actuating elements, for example, the first actuating element 3221, may be transferred to the outside through one output shaft.

The third actuating member 323 may be connected to the ground and support the actuator 31 and/or the gear part 32. The third actuating member 323 may be engaged with any one of the first actuating member 321 and the second actuating member 322. For example, when the third actuating member 323 is engaged with the second actuating member 322, the third actuating member 323 may be disposed on an outer side of the second actuating member 322 and thereby support the second actuating member 322.

The first actuating member 321, the second actuating member 322, and the third actuating member 323 may be a sun gear, a planetary gear, and a ring gear, respectively. Here, the sun gear is an input gear connected to the actuator 31 to receive the rotary force. The planetary gear is an output gear engaged with the sun gear to transfer the rotary force transferred to the sun gear to the outside. The ring gear is a fastened gear engaged with the planet gear and fastened to the ground to support the actuator 31 and/or the gear part 32. However, the sun gear, the planetary gear, and the ring gear are not limited thereto. For example, the planetary gear may be connected to the actuator 31 and the sun gear may be an output gear engaged with the planet gear to transfer the rotary force to the outside.

The first actuating member 321, the second actuating member 322, and the third actuating member 323 may be a wave generator, a flexspline, and a circular spline, respectively. Here, the wave generator may be connected to the actuator 31 to receive the rotary force such that the wave generator is elastically deformed. The flexspline may be connected to the wave generator and is elastically deformed to be in a form of oval due to the wave generator, thereby transferring the rotary force to the outside. The circular spline may be engaged with a portion of the flexspline to support the actuator 31 and/or the gear part 32. However, the wave generator, the flexspline, and the circular spline are not limited thereto.

The elastic member 33 may elastically support the gear part 32. One end of the elastic member 33 is fastened to the ground and the other end of the elastic member 33 is connected to the gear part 32 thereby elastically supporting the gear part 32 in response to the gear part 32 rotating relative to the actuator 31. Thus, the elastic member 33 may be deformed in response to the other end of the elastic member 33 connected to the gear part 32 being displaced based on one end of the elastic member 33 fastened to the ground. Here, the ground may be a flange 362 disposed on the outer side of the actuator 31 or a device (external system) to which the actuator 31 or the elastic actuating device 3 is to be applied.

Based on such structure, in response to the gear part 32 rotating relative to the actuator 31, the elastic member 33 connected to the gear part 32 elastically supports the actuator 31 and/or the gear part 32 such that the rotary force to be transferred to the outside may be accurately measured. That is, a device to which the elastic actuating device 3 is to be applied may be accurately controlled in response to the gear part 32 performing the elastic behavior by the elastic member 33, compared to when the elastic member 33 is absent.

The elastic member 33 may be disposed outside the actuator 31 by surrounding the outer side of the actuator 31 from one end fastened to the ground to the other end connected to a gear part. For example, the elastic member 33 may be a torsional spring. In this example, the elastic member 33 may be disposed outside the actuator 31 such that a central axis of the elastic member 33 corresponds to a central axis of the actuator 31.

Based on such structure, the elastically actuating device 3 may be miniaturized compared to when the actuator 31 and the gear part 32 are connected in series and the elastic member 33 and the gear part 32 are connected in series and thus, the elastically actuating device 3 in a modular type may be applicable to various devices.

The sensing portion 34 may sense a deformation value of the elastic member 33. The sensing portion 34 may be disposed on any one of one end of the elastic member 33 or the other end of the elastic member 33, and may sense the deformation value of the elastic member measured from the one end of the elastic member 33 to the other end of the elastic member 33. For example, the sensing portion 34 is an encoder. In this example, the sensing portion 34 is disposed on the other end of the elastic member 33 and measures the deformation value of the elastic member 33. Here, the deformation value of the elastic member 33 may indicate a torsion angle of the elastic member 33.

The sensing portion 34 includes at least one sensor. The sensing portion 34 includes a first sensor 341 and a second sensor 342.

The first sensor 341 measures a displacement of the first actuating member 321. The first sensor 341 may be disposed on one end of the elastic member 33. The second sensor 342 measures a displacement of the third actuating member 323. The second sensor 342 may be disposed on the other end of the elastic member 33, disposed close to the other end of the elastic member 33, or disposed on the gear part 32. However, this is not limited thereto. The positions of the first sensor 341 and the second sensor 342 may be changed in response to the first actuating member 321, the second actuating member 322, and the third actuating member 323 performing at least one of a function of an input gear to receive the rotary force, a function of an output gear to transfer the rotary force to the outside, and a function of a fastened gear to be fastened to the ground.

The controller 35 may control the rotary force or a rotary speed of the actuator 31 based on the deformation value of the elastic member 33.

In response to the rotary force generated from the actuator 31 and transferred to the outside through the gear part 32 being greater than or equal to a reference rotary force value, the controller 35 may reduce the rotary force of the actuator 31. In response to the rotary force generated from the actuator 31 and transferred to the outside through the gear part 32 being less than the reference rotary force value, the controller 35 may increase the rotary force of the actuator 31. That is, the controller 35 may reduce the rotary force of the actuator 31 in response to the deformation value being greater than a set value, and increase the rotary force of the actuator 31 in response to the deformation value being less than the set value by comparing the deformation value of the elastic member 33 to the set value.

The controller 35 may calculate the displacement of the second actuating member 322 based on the displacement of the first actuating member 321 measured by the first sensor 341 and the displacement of the third actuating member 323 measured by the second sensor 342. For example, the displacement of the second actuating member 322 may be a sum of the displacement of the first actuating member 321 and the displacement of the third actuating member 323. The controller 35 may control the rotary force or the rotary speed of the actuator 31 based on the displacement of the first actuating member 321, the displacement of the second actuating member 322, and/or the displacement of the third actuating member 323.

The supporter 36 may support the actuator 31, the gear part 32, and the elastic member 33, relative to the ground. The supporter 36 includes a connection bracket 361, the flange 362, a fastened bracket 363, and a bearing member 364.

The connection bracket 361 and the gear part 32 may rotate relative to the actuator 31. One end of the connection bracket 361 is connected to the elastic member 33 and the other end of the connection bracket 361 is connected to the gear part 32, and the connection bracket 361 may be extended from the other end of the elastic member 33 to the gear part 32 by surrounding the actuator 31. Based on a connection length of the actuator 31 and the gear part 32 connected in series and a length of the elastic member 33, the connection length of the actuator 31 and the gear part 32 or the length of the elastic member 33 may be compensated when the elastically actuating device 1 is designed.

The flange 362 may be disposed outside the actuator 31 to surround the actuator 31. A plurality of fastening holes may be formed to be spaced apart from each other on the flange 362 in a circumferential direction of the flange 362. One end of the elastic member 33 may be fastened to at least one of the fastening holes on the flange 362. Thus, the flange 362 may be functioned as a ground.

The fastened bracket 363 may be disposed outside the actuator 31 to surround the actuator 31. The fastened bracket 363 may allow the actuator 31 to be fastened with respect to the device (external system) to which the elastically actuating device 3 is to be applied. The fastened bracket 363 may be provided in a tubular structure in which each end is open in order to receive the actuator 31 therein.

The bearing member 364 may be disposed between the connection bracket 361 and the fastened bracket 363. The bearing member 364 may support the connection bracket 361 to allow the connection bracket 361 to be rotatable relative to the connection bracket 363.

The elastically actuating device 3 further includes an auxiliary gear 37. The auxiliary gear 37 may be connected to the actuator 31 in series to reduce the rotary speed of the actuator 31.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

The invention claimed is:

1. An elastically actuating device comprising:
    an actuator configured to generate a rotary force;
    a gear part connected to the actuator and configured to transfer the rotary force from the actuator to an outside; and
    an elastic member including one end fastened to a ground and the other end connected to the gear part, disposed outside the actuator to cover the actuator from the one end to the other end, and deformed in response to the gear part rotating relative to the actuator, wherein the ground is the actuator, an external system, or a flange provided on an outer side of the actuator.

2. The elastically actuating device of claim 1, wherein the gear part comprises:
   a first actuating member connected to the actuator to be rotatable relative to the actuator;
   a second actuating member configured to transfer the rotary force from the first actuating member to the outside; and
   a third actuating member engaged with the first actuating member or the second actuating member and connected to the other end of the elastic member.

3. The elastically actuating device of claim 2, wherein the second actuating member is engaged with the first actuating member, and the third actuating member is engaged with the second actuating member.

4. The elastically actuating device of claim 3, wherein the first actuating member is a sun gear, the second actuating member is a planetary gear, and the third actuating member is a ring gear.

5. The elastically actuating device of claim 3, wherein the first actuating member is a waveform generator, the second actuating member is a flexspline, and the third actuating member is a circular spline.

6. The elastically actuating device of claim 1, further comprising:
   a sensing portion disposed on one end or the other end of the elastic member and configured to sense a deformation value of the elastic member measured from the one end of the elastic member to the other end of the elastic member.

7. The elastically actuating device of claim 6, further comprising:
   a controller configured to control a rotary force or a rotary speed of the actuator based on the deformation value of the elastic member.

8. An elastically actuating device comprising:
   an actuator configured to generate a rotary force;
   a gear part connected to the actuator and configured to transfer the rotary force from the actuator to an outside;
   an elastic member including one end fastened to a ground and the other end connected to the gear part, disposed outside the actuator to cover the actuator from the one end to the other end, and deformed in response to the gear part rotating relative to the actuator; and
   a connection bracket connected to the other end of the elastic member and the gear part, the connection bracket being extended from the other end of the elastic member to the gear part by covering the actuator.

9. The elastically actuating device of claim 8, further comprising:
   a fastened bracket disposed on an outer side of the actuator and configured to allow the actuator to be fastened to an external system; and
   a bearing member disposed between the connection bracket and the fastened bracket.

10. An elastically actuating device comprising:
    an actuator configured to generate a rotary force;
    a gear part connected to the actuator and configured to transfer the rotary force from the actuator to an outside;
    an elastic member including one end fastened to a ground and the other end connected to the gear part, disposed outside the actuator to cover the actuator from the one end to the other end, and deformed in response to the gear part rotating relative to the actuator; and
    an auxiliary gear part configured to connect the actuator and the gear part and decrease a rotary speed of the actuator.

11. An elastically actuating device comprising:
    an actuator configured to generate a rotary force;
    a gear part including a first actuating member connected to the actuator to be rotatable relative to the actuator, a second actuating member engaged with the first actuating member, and a third actuating member engaged with the second actuating member;
    an elastic member including one end fastened to a ground and the other end connected to the third actuating member, and configured to elastically support the gear part;
    a first sensor configured to measure a displacement of the first actuating member; and
    a second sensor configured to measure a displacement of the third actuating member.

12. The elastically actuating device of claim 11, wherein the first actuating member is a sun gear, the second actuating member is a planetary gear, and the third actuating member is a ring gear.

13. The elastically actuating device of claim 11, wherein the first actuating member is a waveform generator, the second actuating member is a flexspline, and the third actuating member is a circular spline.

14. The elastically actuating device of claim 11, further comprising:
    a controller configured to calculate a displacement of the second actuating member based on the measured displacement of the first actuating member and the measured displacement of the third actuating member, and control the rotary force and a rotary speed of the actuator based on the displacement of the first actuating member, the displacement of the second actuating member, or the displacement of the third actuating member.

* * * * *